(12) United States Patent
Sousa et al.

(10) Patent No.: US 12,303,067 B2
(45) Date of Patent: May 20, 2025

(54) REVERSIBLE COOKING GRATE

(71) Applicant: Jordan Kahn Company, Newton, MA (US)

(72) Inventors: Mark Sousa, Hope, RI (US); Wai Ho, Boston, MA (US)

(*) Notice: Subject to any disclaimer, the term of this patent is extended or adjusted under 35 U.S.C. 154(b) by 779 days.

(21) Appl. No.: 17/591,911

(22) Filed: Feb. 3, 2022

(65) Prior Publication Data

US 2023/0240473 A1    Aug. 3, 2023

(51) Int. Cl.
*A47J 37/06* (2006.01)
*A47J 37/07* (2006.01)

(52) U.S. Cl.
CPC ......... *A47J 37/067* (2013.01); *A47J 37/0786* (2013.01)

(58) Field of Classification Search
CPC .. A47J 37/0658; A47J 37/067; A47J 37/0704; A47J 37/0781; A47J 37/0786
See application file for complete search history.

(56) References Cited

U.S. PATENT DOCUMENTS

| 2010/0147281 A1* | 6/2010 | Gustavsen | F24B 1/003 126/21 A |
| 2010/0294138 A1* | 11/2010 | Bryce | A47J 37/067 99/450 |

* cited by examiner

*Primary Examiner* — Hung D Nguyen
(74) *Attorney, Agent, or Firm* — Frank Marino

(57) ABSTRACT

A multi-purpose cooking grate has a planar perforated grid with a flat grilling side and a pizza-cooking side. The pizza-cooking side includes features to support a pizza-cooking stone such that a vertical distance is maintained there-between, and locators to engage the periphery of the stone so that it is horizontally restrained.

13 Claims, 5 Drawing Sheets

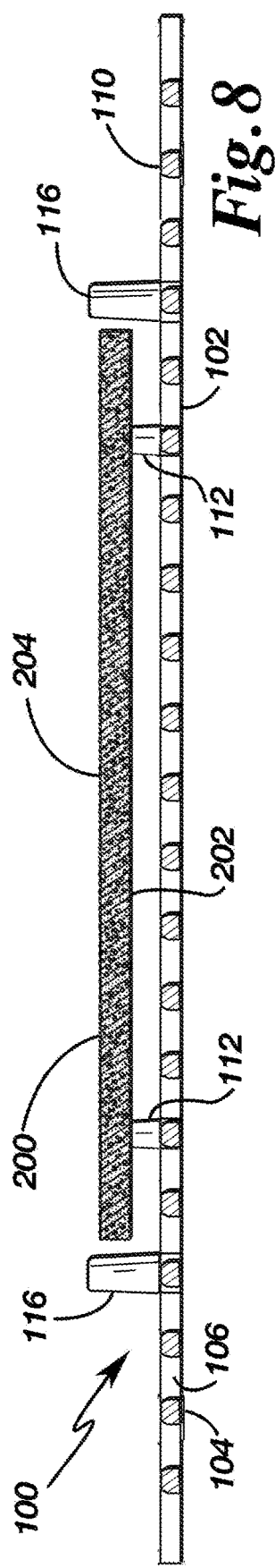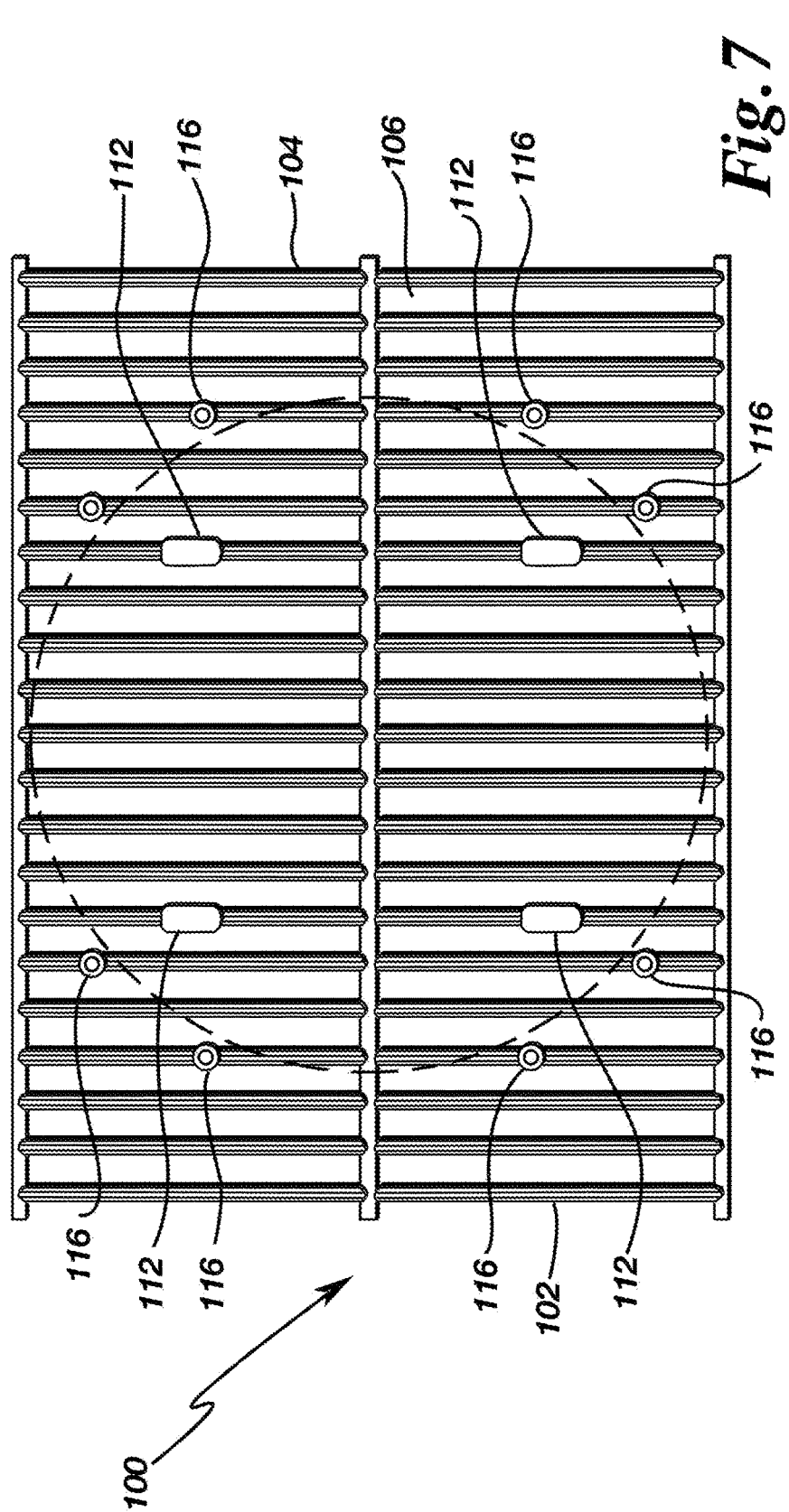

REVERSIBLE COOKING GRATE

FIELD OF THE INVENTION

The present invention is related to grilling and pizza cooking. More specifically, the invention is related to a grate for a grill or pizza cooker that is reversible to optimize grilling in one configuration and pizza cooking in another.

BACKGROUND

Pizza cooking ovens are well known and generally include some type of flat surface within a heated chamber onto which a raw pizza is placed for cooking. Such pizza cooking ovens are oftentimes dedicated for cooking only pizza but are sometimes also incorporated into ovens or BBQ grills having a lid with an openable front window through which the pizza can be passed into the heated chamber. The flat surface is sometimes a griddle surface resting over a heat source within the chamber, or may be a flat pan or stone on which the raw pizza is placed before inserting through the window and onto a perforated grate over a heat source within the chamber.

Problems associated with such prior art pizza cookers and pizza cooking methods include an inability to properly position the pizza over the heat source for thorough cooking across the entire pizza, and uneven distribution of heat to the underside of the pizza due to hot spots created by the heat source.

There is a need, and such is an object of the invention, to provide a more secure and reliable support structure for a pan or stone of pizza cooking oven so that thorough cooking across the entire pizza is consistently achieved.

There is a need, and such is another object of the invention, to provide means for ensuring even distribution of heat to the underside of the pizza being cooked within a pizza oven despite hot spots which may be created by the heat source.

There is a need, and such is another object of the invention, to provide a cooking oven or BBQ adapted to enable optimal pizza cooking while alternatively enabling optimal grilling other cooking foods.

Further needs and objects exist which are addressed by the present invention, as may become apparent upon review of the included disclosure of exemplary embodiments thereof.

SUMMARY OF THE INVENTION

The invention may be embodied in or practiced using a grate for a BBQ or oven, which is adapted to enable optimal pizza cooking while alternatively enabling optimal grilling other cooking foods. The grate accomplishes this by being reversible with one side configured for optimal pizza cooking and the other side configured for traditional grilling. When positioned for pizza cooking, the grate provides a secure and reliable support structure for a pan or stone so that thorough cooking across the entire pizza is consistently achieved. The grate accomplishes this by including features to ensure proper positioning of the pan or stone over the heat source of the BBQ or oven. The grate also ensures even distribution of heat to the underside of the pizza being cooked despite hot spots which may be created by the heat source. The grate accomplishes this by including features to space the pan or stone above a perforated portion to maximize temperature consistency just under the cooking pizza.

The invention may be embodied in or practiced using a pizza cooking grate made of a planar grid with perforations therethrough and adapted to be oriented horizontally. The grate may have a first plurality of supports adapted to engage a bottom surface of a pizza cooking element resting thereatop such that a vertical distance is maintained between the bottom surface and the grid, and a second plurality of locators adapted to engage a peripheral outer shape of the pizza cooking element such that the pizza cooking element is horizontally restrained. The pizza cooking element may be a pizza pan or a pizza stone. The grid may be made of ribs having open spaces therebetween to comprise the perforations. The grid may be cast metal and the supports and locators may be cast integrally with the ribs. The vertical distance may by an air space adapted to enable air circulation between the bottom surface and the grid. The peripheral outer shape may be a circle with the locators disposed around and outboard thereof. The supports may be disposed inboard of the circle.

The invention may alternatively be embodied in or practiced using a multi-purpose cooking grate made of a planar perforated grid having a flat grilling side and a pizza-cooking side, and adapted to be oriented horizontally with the flat grilling side up for grilling and barbequing, and to be oriented horizontally with the pizza-cooking side up for pizza cooking with a pizza-cooking element resting thereatop. The pizza side may be configured as above.

The invention may alternatively be embodied in or practiced using, in combination, the multi-purpose cooking grate and the pizza-cooking stone.

Further features and aspects of the invention are disclosed with more specificity in the Detailed Description and accompanying drawings of an exemplary embodiment provided herein.

BRIEF DESCRIPTION OF THE DRAWINGS

Many aspects of the invention can be better understood with reference to the included Drawings showing an exemplary embodiment for practicing the invention which corresponds to the accompanying Detailed Description. The components in the Drawings are not necessarily to scale, emphasis instead being placed upon clearly illustrating the principles of the invention. Moreover, like reference numerals in the Drawings designate corresponding parts throughout the several views.

FIG. 7 is a top (pizza side) view of the grate of FIG. 1; and

FIG. 8 is a cross sectional view the grate and pizza stone taken at Line 8-8 of FIG. 6.

DETAILED DESCRIPTION OF AN EXEMPLARY EMBODIMENT

Figure 1:
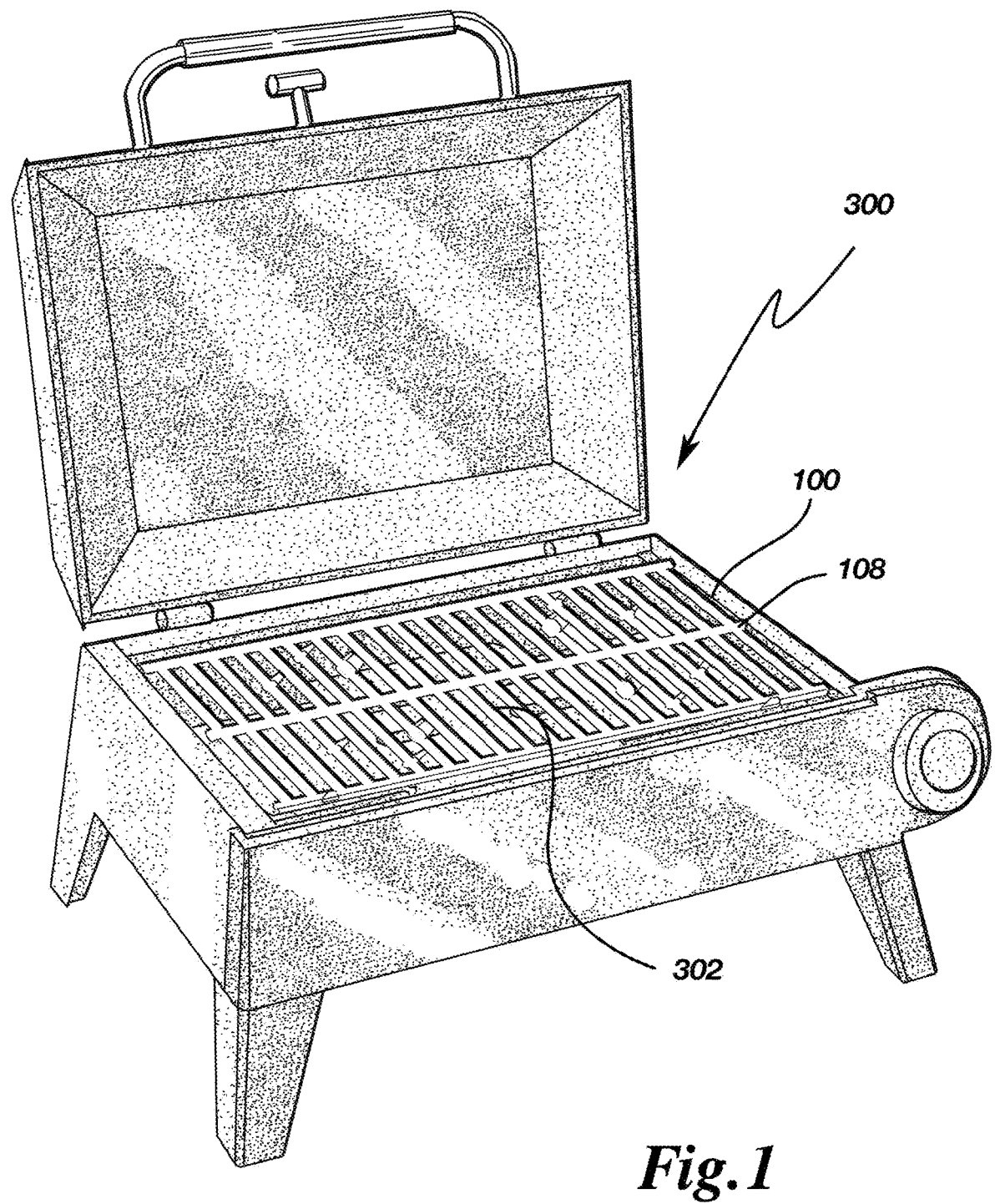
FIG. 1 is a perspective view of an outdoor cooking appliance including an exemplary reversible grate according to or useful in practicing the invention in its grilling orientation.
Figure 2:
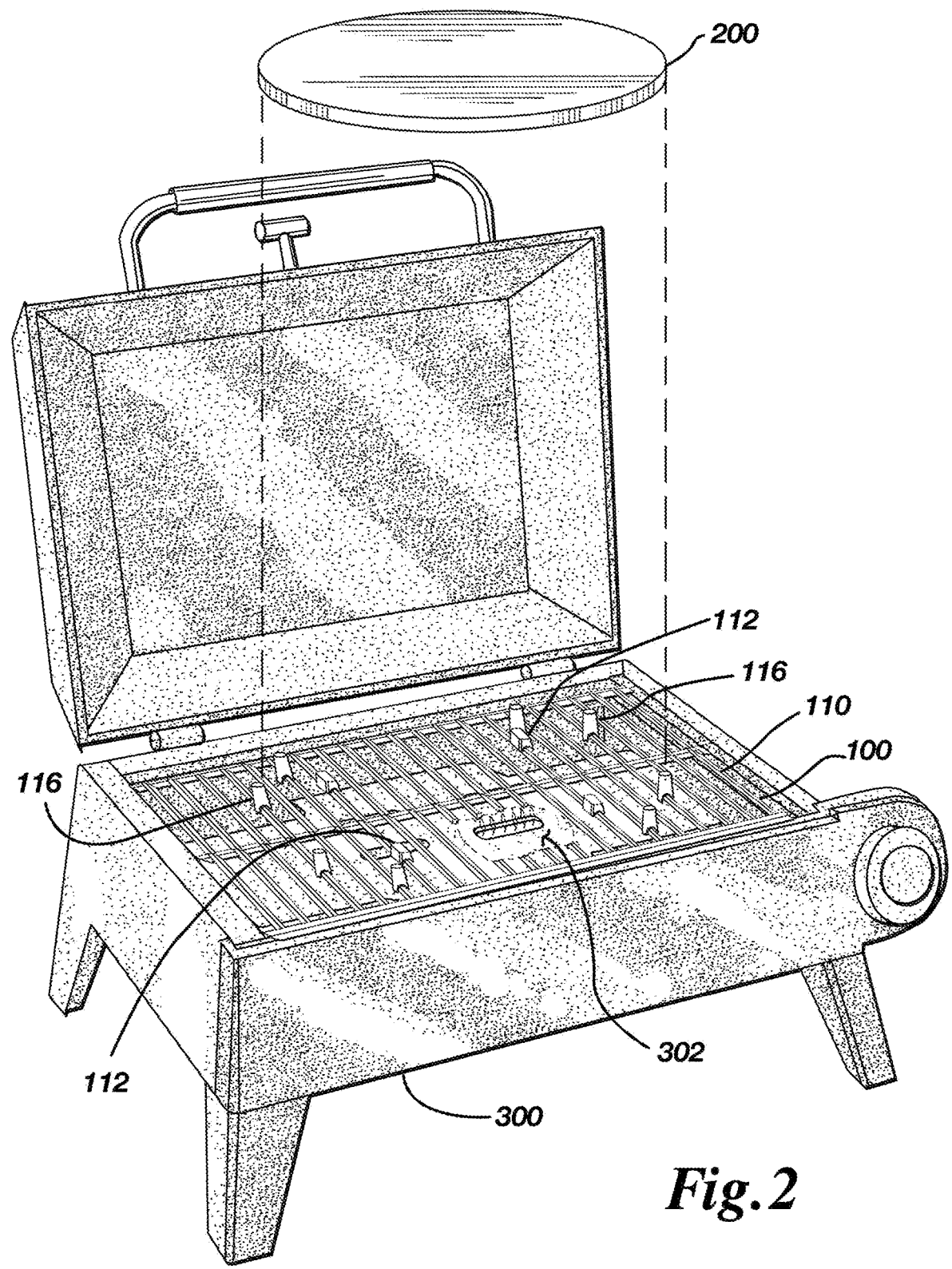
FIG. 2 is a perspective view of a pizza stone and the outdoor cooking appliance with the grate of FIG. 1 in its pizza orientation.

An exemplary multi-purpose cooking grate 100 and a pizza stone 200 for use therewith are shown in FIGS. 1 through 8 and are intended for cooking over a heat source such as barbeque grill 300 or within a pizza oven. The stone has a flat bottom surface 202, a flat top surface 204 parallel thereto for receiving a pizza to be cooked thereon, and a circular periphery 206. The stone is approximately one-half of an inch thick and approximately fourteen inches in diameter.

Figure 3:
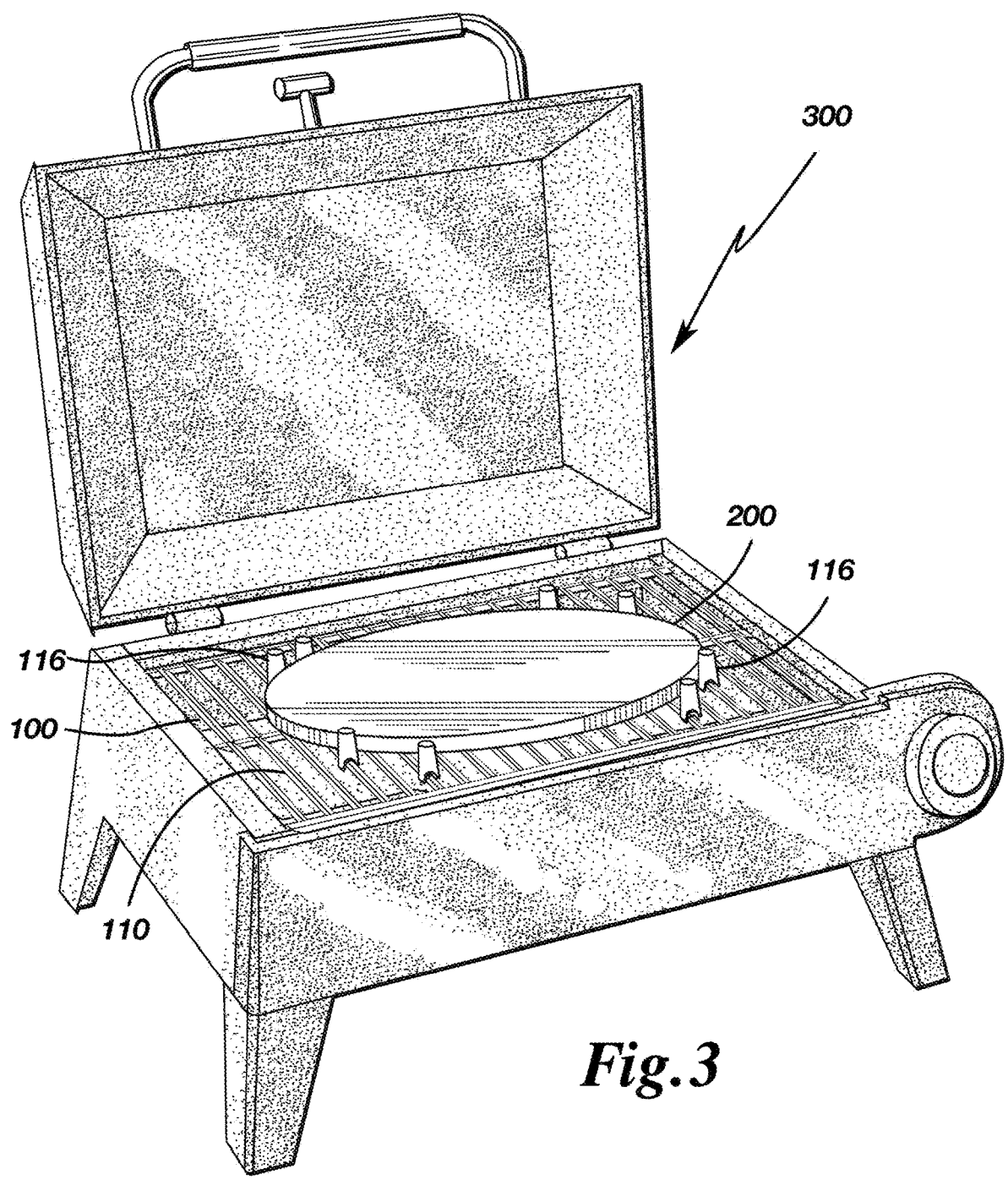
FIG. 3 is a perspective view of the outdoor cooking appliance with the grate of FIG. 1 in its pizza orientation with the pizza stone installed.
Figure 4:
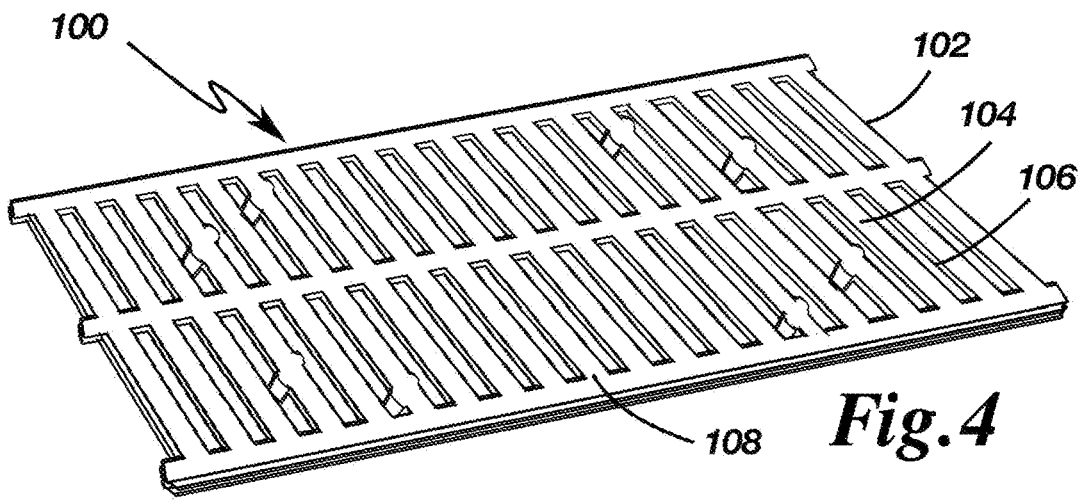
FIG. 4 is a perspective view of the grate of FIG. 1 in its grilling orientation.
Figure 5:
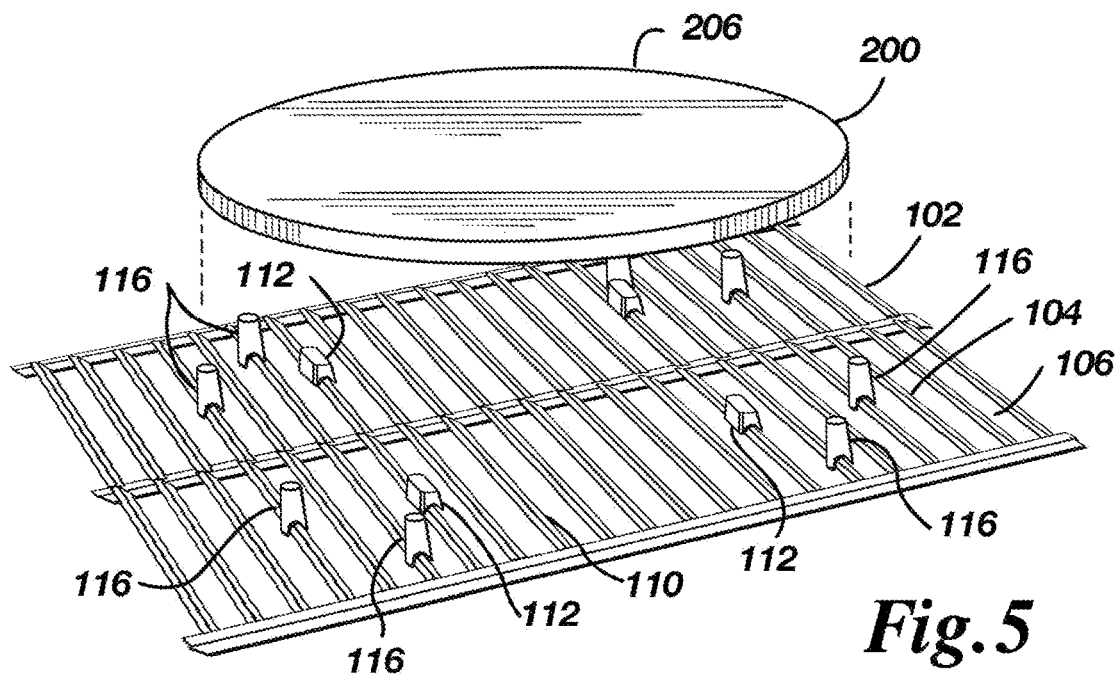
FIG. 5 is a perspective view of the pizza stone and the grate of FIG. 1 in its pizza orientation.
Figure 6:
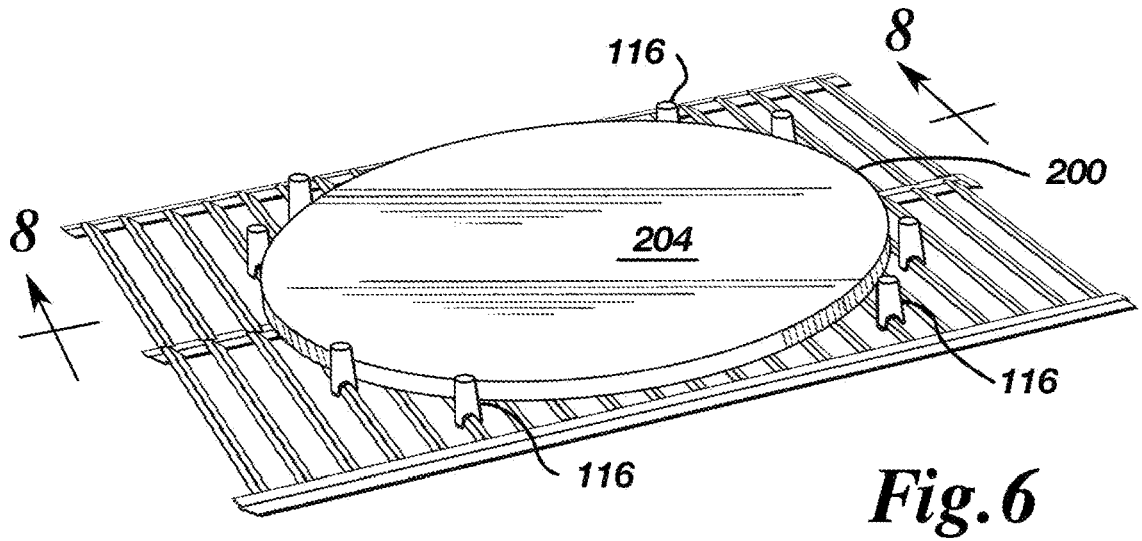
FIG. 6 is a perspective view of the grate of FIG. 1 in its pizza orientation with the pizza stone installed.

The grate includes a planar grid 102 of one-quarter of an inch wide ribs 104 with three-quarters of an inch wide spaces 106 there between to serve as perforations therethrough to allow heated air to pass from a heat-source 302 within the barbeque grill and below the grate. The heat source is one of burning charcoal, burning wood, a gas burner, or an electric heating element. The grill has a flat grilling side 108 and a pizza-cooking side 110, and is adapted to be oriented horizontally with the flat grilling side up for grilling and barbequing absent the stone or to be flipped over and be oriented horizontally with the pizza-cooking side up for pizza cooking with the stone resting there-atop, as seen in FIGS. 3, 6, and 8.

When the grate is used with the grilling side up, it performs exactly as a typical barbeque grill and is ideal for grilling such foods as steaks, burger, vegetables, etc., in the traditional manner.

The pizza side has four support posts 112 each one-quarter of an inch tall and adapted to engage the stone's bottom surface such that the stone rests on the supports and a vertical distance 114 of the same one-quarter of an inch maintained between the bottom surface and the grid. This vertical distance creates an airspace which allows the heated air to circulate below the stone and spread evenly to heat the stone evenly, so that even if the heat source causes "hot spots" such as just above plumes for flame or such, those hot spots and cooler areas will be balanced out to ensure that the stone has an even temperature there-across as long as it is disposed directly above the heat source.

The pizza side also has eight locator posts 116 each three-quarters of an inch tall and disposed around a circular pattern. The posts are one-quarter of an inch in diameter and the circular pattern is approximately fourteen and one-half inches in diameter so that the posts for an inner diameter just larger than the diameter of the stone. When the stone is rested on the support posts, the locators surround the stone and ensure that it is properly positioned directly over the heat source and is horizontally restrained. This also ensures proper and even cooking that is consistent from pizza to pizza. The grate is preferably made of cast iron with the ribs and posts formed integrally thereof. The stone may be made of any heat resistant material such as stone itself, ceramic, or a cementitious material. An ordinary circular metal pizza pan may be less preferably substituted for the stone.

Various changes in form and detail may be made without departing from the spirit and scope of the invention, so the invention should therefore only be considered according to the following claims, including all equivalent interpretation to which they are entitled.

We claim:

1. A pizza cooking grate comprising:
   a planar grid with perforations therethrough and adapted to be oriented horizontally and comprising;
   a first plurality of supports adapted to engage a bottom surface of a pizza cooking element resting there-atop such that a vertical distance is maintained between the bottom surface and the grid, and a second plurality of locators, taller than the supports and adapted to engage a peripheral outer shape of the pizza cooking element such that the pizza cooking element is horizontally restrained;
   wherein the pizza cooking element is one of a pizza pan and a pizza stone;
   wherein the grid is comprised of ribs having open spaces therebetween to comprise the perforations and; wherein the grid is cast metal and the supports and locators are cast integrally with the ribs.

2. The pizza cooking grate of claim 1 wherein the vertical distance is an air space.

3. The pizza cooking grate of claim 2 wherein the air space is adapted to enable air circulation between the bottom surface and the grid.

4. The pizza cooking grate of claim 3 wherein the peripheral outer shape is a circle.

5. The pizza cooking grate of claim 4 wherein the locators are disposed around and outboard of the circle.

6. The pizza cooking grate of claim 5 wherein the supports are disposed inboard of the circle.

7. The pizza cooking grate of claim 6 wherein the grid, supports, and locators are integrally cast.

8. A multi-purpose cooking grate comprising:
   a planar perforated grid having a flat grilling side and a pizza-cooking side, and adapted to be oriented horizontally with the flat grilling side up for grilling and barbequing, and to be oriented horizontally with the pizza-cooking side up for pizza cooking with a pizza-cooking element resting there-atop; wherein
   the pizza side comprises a first plurality of supports adapted to engage a bottom surface of the pizza cooking element such that a vertical distance is maintained between the bottom surface and the grid, and a second plurality of locators, taller than the support and adapted to engage a peripheral outer shape of the pizza cooking element such that the pizza cooking element is horizontally restrained;
   wherein the pizza cooking element is one of a pizza pan and a pizza stone;
   wherein the grid is comprised of ribs having open spaces therebetween to comprise the perforations and;
   wherein the grid is cast metal and the supports and locators are cast integrally with the ribs.

9. The multi-purpose cooking grate of claim 8 wherein the vertical distance is an air space.

10. The multi-purpose cooking grate of claim 9 wherein the air space is adapted to enable air circulation between the bottom surface and the grid.

11. The multi-purpose cooking grate of claim 10 wherein the peripheral outer shape is a circle.

12. The multi-purpose cooking grate of claim 11 wherein the locators are disposed around and outboard of the circle.

13. The multi-purpose cooking grate of claim 12 wherein the supports are disposed inboard of the circle.

* * * * *